GEISS & BROSIUS.
Vegetable Cutter.
No. 16,078.
Patented Nov. 11, 1856.
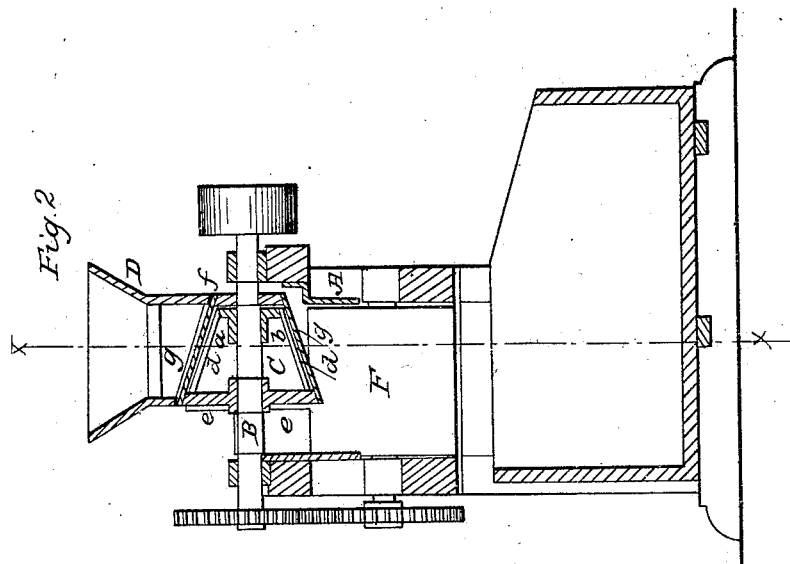
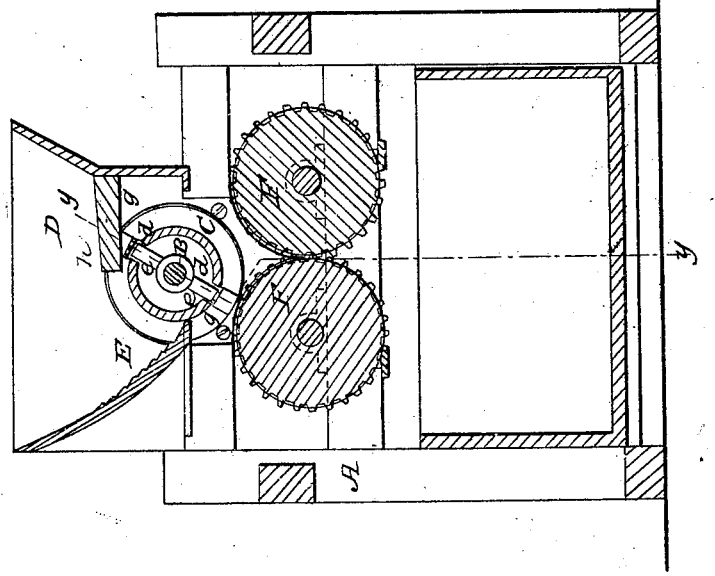

UNITED STATES PATENT OFFICE.

JACOB GEISS AND JACOB BROSIUS, OF BELLEVILLE, ILLINOIS.

MACHINE FOR CUTTING VEGETABLES.

Specification of Letters Patent No. 16,078, dated November 11, 1856.

*To all whom it may concern:*

Be it known that we, Jacob Geiss and Jacob Brosius, of Belleville, in the county of St. Clair and State of Illinois, have invented a new and Improved Machine for Cutting or Slicing Vegetables; and we do hereby declare that the following is a full, clear, and exact description of the same, reference being had to the annexed drawings, making a part of this specification, in which—

Figure 1, is a vertical section of my improvement, $(x)$, $(x)$, Fig. 2, showing the plane of section. Fig. 2, is also a vertical section of ditto, $(y)$, $(y)$, Fig. 1, showing the plane of section.

Similar letters of reference indicate corresponding parts in the two figures.

Our invention consists in the employment or use of a hollow cone placed upon a shaft and having longitudinal slots made through its periphery over which slots knives are placed, said knives being attached at one end to arms on the shaft of the hollow cone, and the opposite ends attached to a disk on said shaft, the parts being so arranged that the cone may be moved on the shaft, so that the vegetables may be cut finer or coarser as desired.

To enable those skilled in the art to fully understand and construct our invention, we will proceed to describe it.

A, represents the framing of the machine, constructed in any proper manner.

B, represents a shaft which is placed transversely on the upper part of the framing A; and C, represents a hollow cone, the smaller end $(a)$, of which is closed and has a socket $(b)$, at its center through which the shaft B, passes, the cone being secured to the shaft by a set screw. The larger end of the cone C, is open, and the periphery of the cone has two longitudinal slots $(d)$, $(d)$, made in it. On the shaft B, there are two arms $(e)$, $(e)$, secured, and the ends of these arms are fitted in the ends of the slots $(d)$, $(d)$, and a disk $(f)$, is also secured on the shaft B, said disk being at the smaller end of the cone C. To the ends of the arms $(e)$, $(e)$, and to the edge of the disk $(f)$, knives $(g)$, $(g)$, are attached, said knives being directly over the slots $(d)$, $(d)$, in the cone C.

D, is a hopper which encompasses the cone C, one end piece of said hopper being formed of an inclined plate E, having its inner surface corrugated or ribbed, as shown clearly in Fig. 1. A horizontal partition plate $(h)$, is fitted within the hopper D, said plate $(h)$, being above the cone C, and preventing the vegetables from passing down at one side of it. This will be understood by referring to Fig. 1.

The operation is as follows: The vegetables to be cut are placed within the hopper D, and pass down between the plate E, and cone C. Motion is given the shaft B, in any proper manner, and the vegetables are cut or sliced by the cutters $(g)$, the sliced or cut portions passing within the cone C, and falling out of its larger end, the ribbed plate E, preventing the vegetables from receding from the knives. The vegetables may be cut finer or coarser by shifting the position of the cone C, upon the shaft so as to bring the slots $(d)$, $(d)$, nearer to or farther from the knives $(g)$, $(g)$.

The above improvement is admirally adapted for making cider, for rollers F, F, may be placed underneath the cone C, and the juice expressed from the sliced apples without breaking them or making them into a paste as is now done. The juice will consequently be free from fine particles of pulp or pumice.

The invention is extremely simple, economical to manufacture, and may be used for cutting the various kinds of vegetables now used as food for stock and for ordinary purposes.

Having thus described our invention, what we claim as new, and desire to secure by Letters Patent, is,

The cone C, provided with slots $(d)$, $(d)$, and secured upon the shaft B, as shown, in combination with the knives $(g)$, attached to the arms $(e)$, $(e)$, and disk $(f)$, arranged as shown and described for the purpose specified, it being understood that we do not claim the use of a hollow revolving cone, armed with knives, for slicing vegetables, as that is not new; but only the mode of construction herein specified, for effecting the adjustment for the thickness of the slices.

JACOB GEISS.
JACOB BROSIUS.

Witnesses:
Casper Thiell,
Wm. H. Snyder.